US012808831B2

(12) United States Patent
Duffy et al.

(10) Patent No.: US 12,808,831 B2
(45) Date of Patent: Nov. 24, 2026

(54) INCREASING THE LIFESPAN OF REFERENCE ELECTRODES BY INCREASING THE DIFFUSION LENGTH

(71) Applicant: The Penn State Research Foundation, University Park, PA (US)

(72) Inventors: Timothy S. Duffy, University Park, PA (US); Derek M. Hall, University Park, PA (US); Serguei N. Lvov, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 142 days.

(21) Appl. No.: 18/840,274

(22) PCT Filed: Nov. 23, 2022

(86) PCT No.: PCT/US2022/080400
§ 371 (c)(1),
(2) Date: Aug. 21, 2024

(87) PCT Pub. No.: WO2023/183060
PCT Pub. Date: Sep. 28, 2023

(65) Prior Publication Data

US 2025/0180503 A1 Jun. 5, 2025

Related U.S. Application Data

(60) Provisional application No. 63/269,941, filed on Mar. 25, 2022.

(51) Int. Cl.

| | |
|---|---|
| ***G01N 27/403*** | (2006.01) |
| ***G01N 27/30*** | (2006.01) |
| ***G01N 27/416*** | (2006.01) |

(52) U.S. Cl.
CPC ......... *G01N 27/301* (2013.01); *G01N 27/403* (2013.01); *G01N 27/416* (2013.01)

(58) Field of Classification Search
CPC .... G01N 27/30; G01N 27/301; G01N 27/403; G01N 27/4035; G01N 27/416
See application file for complete search history.

(56) References Cited

U.S. PATENT DOCUMENTS 4,933,048 A * 6/1990 Lauks .................. G01N 27/301
427/125
7,273,517 B1 9/2007 Lewis et al.
(Continued)

FOREIGN PATENT DOCUMENTS

JP 3771707 B2 4/2006
WO 02077641 A2 10/2002

OTHER PUBLICATIONS

Whittingham et al., "Additive manufacturing for electrochemical labs: An overview and tutorial note on the production of cells, electrodes and accessories," Talanta Open 4 (2021) 100051 (Year: 2021).*

(Continued)

*Primary Examiner* — Alexander S Noguerola
(74) *Attorney, Agent, or Firm* — Buchanan Ingersoll & Rooney PC

(57) ABSTRACT

Embodiments relate to an electrode housing having a member configured to house filling solution. The member includes an electrode housing first end and an electrode housing second end. The member has a length extending from the electrode housing first end to the electrode housing second end. The member has a width and a depth, each of the width and the depth being orthogonal to the length. The member includes a single diffusion channel extending from the electrode housing first end to the electrode housing (Continued)

second end. The single diffusion channel has a path profile that extends along the length and at least one of the width and the depth.

12 Claims, 16 Drawing Sheets

(56) References Cited

U.S. PATENT DOCUMENTS

| | | | | |
|---|---|---|---|---|
| 8,840,767 | B2 | 9/2014 | Wen et al. | |
| 2014/0374271 | A1 | 12/2014 | Broadley et al. | |
| 2016/0320326 | A1* | 11/2016 | Zevenbergen ....... | G01N 27/413 |

OTHER PUBLICATIONS

Sibug-Torres et al., "Fabrication of a 3D-Printed Porous Junction for Ag|AgCl|gel-KCI Reference Electrode," Chemosensors 2020, 8, 130 (Year: 2020).*

International Search Report and Written Opinion for PCT/US2022/080400 filed Nov. 23, 2022, dated Mar. 22, 2023.

* cited by examiner

INCREASING THE LIFESPAN OF REFERENCE ELECTRODES BY INCREASING THE DIFFUSION LENGTH

CROSS-REFERENCE TO RELATED APPLICATIONS

This patent application is a U.S. national stage application under 35 U.S.C. § 371 for International Patent Application No. PCT/US2022/080400, filed on Nov. 23, 2022, which is related to and claims the benefit of U.S. provisional patent application No. 63/269,941, filed on Mar. 25, 2022, the entire contents of each is incorporated herein by reference.

STATEMENT REGARDING FEDERALLY SPONSORED RESEARCH OR DEVELOPMENT

This invention was made with government support under Contract No. 89243319CFE000032 awarded by the Department of Energy/NETL. The Government has certain rights in the invention.

FIELD OF THE INVENTION

Embodiments relate to a reference electrode having channels formed in a body of the electrode. Some embodiments include an agar/potassium chloride solution within the channels.

BACKGROUND OF THE INVENTION

Currently known reference electrode designs are limited in that their operational lifetimes are relatively short, especially if they are continuously exposed to a test environment (e.g., days to weeks without filling solution refreshment.) Their lifetime typically depends on having a stable concentration of electrolyte at the reference couple (e.g., constant KCl(aq) concentration for the Ag/AgCl couple).

BRIEF SUMMARY OF THE INVENTION

Embodiments relate to a reference electrode design with greatly improved lifetime for electrochemical measurements. 3D printing or machining can be used to maximize the channel length between the reference electrode's reference couple (e.g., silver/silver chloride) and the testing environment. For example, a grid of narrow cavities can be 3D-printed or machined into a plastic body. Top and bottom plates can be 3D printed or machined, which can be adhered to the grid of cavities to connect the cavities into a single, long, serpentine channel. This channel can be filled with a filling solution (e.g., an agar/potassium chloride). A couple (e.g., silver/silver chloride) can be inserted at one end of the channel, while the other end of the channel is open to the testing solution for electrochemical measurements.

Embodiments of the reference electrode provide for an inexpensive housing design based on 3D printing or machining to fabricate a long serpentine diffusion path between the reference couple and test solution. Based on Fick's laws of diffusion, this increased diffusion path length increases the lifetime of the reference electrode by orders of magnitude (e.g., months to decades of stability) without maintenance. For instance, a 1 cm long path lasted 6 hours, compared to over 100 days of operation for a 75 cm long channel. In addition, a single narrow channel can fit within a relatively small volume using 3D printing or machining techniques (i.e., 1 meter within 10 cubic cm). Other designs for improving the operational lifetime of miniaturized reference electrodes focus on the filling solution or junction to reduce the diffusion coefficient (rate) for the electrolyte, which can be costly (see U.S. Pat. Nos. 8,840,767 and 10,634,638). Based on Fick's laws of diffusion, however, changing the diffusion coefficient is much less effective at increasing the sensor life than changing the geometry. The inventive reference electrode design can, therefore, be a cost-effective, improved, and simpler alternative to the current state-of-the-art, long lasting reference electrodes.

Embodiment of the reference electrode can be applied to systems where electrochemical potentials are routinely measured or required, and specifically when an accurate and stable potential is required for an extended time. Electrochemical sensors, corrosion monitoring and protection, environmental monitoring, and biological/medical sensors are a few of many industries that would be impacted by this technology.

An exemplary embodiment can relate to an electrode housing. The electrode housing can include a member configured to house filling solution. The member can include an electrode housing first end and an electrode housing second end. The member can have a length extending from the electrode housing first end to the electrode housing second end. The member can have a width and a depth, each of the width and the depth being orthogonal to the length. The housing can include a single diffusion channel extending from the electrode housing first end to the electrode housing second end. The single diffusion channel can have a path profile that extends along the length and at least one of the width and the depth.

In some embodiments, the single diffusion channel can form an opening in the electrode housing first end and an opening in the electrode housing second end.

In some embodiments, the path profile can include a path route in the length direction that is longer than a path route in the width and/or the depth direction.

In some embodiments, the path profile can include path routes in the length direction that are, in average, longer than path routes, in average, in the width and/or the depth direction.

In some embodiments, the path profile can have a serpentine shape.

In some embodiments, the single diffusion channel can be formed in the member via an additive manufacturing technique and/or a machining technique.

An exemplary embodiment can relate to an electrode. The electrode can include an electrode housing configured to house filling solution. The electrode housing can include an electrode housing first end and an electrode housing second end. The electrode housing can have a length extending from the electrode housing first end to the electrode housing second end. The electrode housing can have a width and a depth, each of the width and the depth being orthogonal to the length. The electrode housing can include a single diffusion channel extending from the electrode housing first end to the electrode housing second end. The single diffusion channel can have a path profile that extends along the length and at least one of the width and the depth. The single diffusion channel can have a diffusion channel first end that forms an opening in the electrode housing first end and a diffusion channel second end that forms an opening in the electrode housing second end. The electrode can include a reference couple located within the diffusion channel first end.

Some embodiments can include filling solution within the single diffusion channel.

In some embodiments, the filling solution can be agar gel concentrated with KCl electrolyte.

In some embodiments, the reference couple can include silver/silver chloride, silver/silver halides, mercury/mercurous salts, or metal/metal sulfates.

In some embodiments, the path profile can include a path route in the length direction that is longer than a path route in the width and/or the depth direction.

In some embodiments, the path profile can include a path routes in the length direction that are, in average, longer than path routes, in average, in the width and/or the depth direction.

In some embodiments, the path profile can have a serpentine shape.

An exemplary embodiment can relate to a reference electrode that includes an embodiment of an electrode described herein.

An exemplary embodiment can relate to a sensor that includes an embodiment of an electrode described herein.

An exemplary embodiment can relate to a method of fabricating an electrode housing.

The method can involve forming a single diffusion channel extending from the electrode housing first end to the electrode housing second end. The single diffusion channel can have a path profile that extends along a length of the electrode housing and at least one of a width and a depth of the electrode housing. Forming the single diffusion channel can be performed via an additive manufacturing technique or via a machining technique.

In some embodiments, forming the single diffusion channel involves forming at least a portion of the single diffusion channel in a component of the electrode housing.

In some embodiments, the method can involve forming a first portion of the single diffusion channel in a first component of the electrode housing. In some embodiments, the method can involve forming a second portion of the single diffusion channel in a second component of the electrode housing. In some embodiments, the method can involve assembling the first component with the second component such that the first portion of the first portion of the single diffusion channel aligns with the second portion of the single diffusion channel.

In some embodiments, assembling the first component with the second component can generate the electrode housing having the single diffusion channel extending from the electrode housing first end to the electrode housing second end. The single diffusion channel can form an opening at the electrode housing first end and an opening at the electrode housing second end.

In some embodiments, the path profile can include a path route in the length direction that is longer than a path route in the width and/or the depth direction.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages, and possible applications of the present invention will be more apparent from the following more particular description thereof, presented in conjunction with the following drawings. It should be understood that like reference numbers used in the drawings may identify like components.

DETAILED DESCRIPTION OF THE INVENTION

The following description is of an embodiment presently contemplated for carrying out the present invention. This description is not to be taken in a limiting sense but is made merely for the purpose of describing the general principles and features of the present invention. The scope of the present invention should be determined with reference to the claims.

Figure 1:
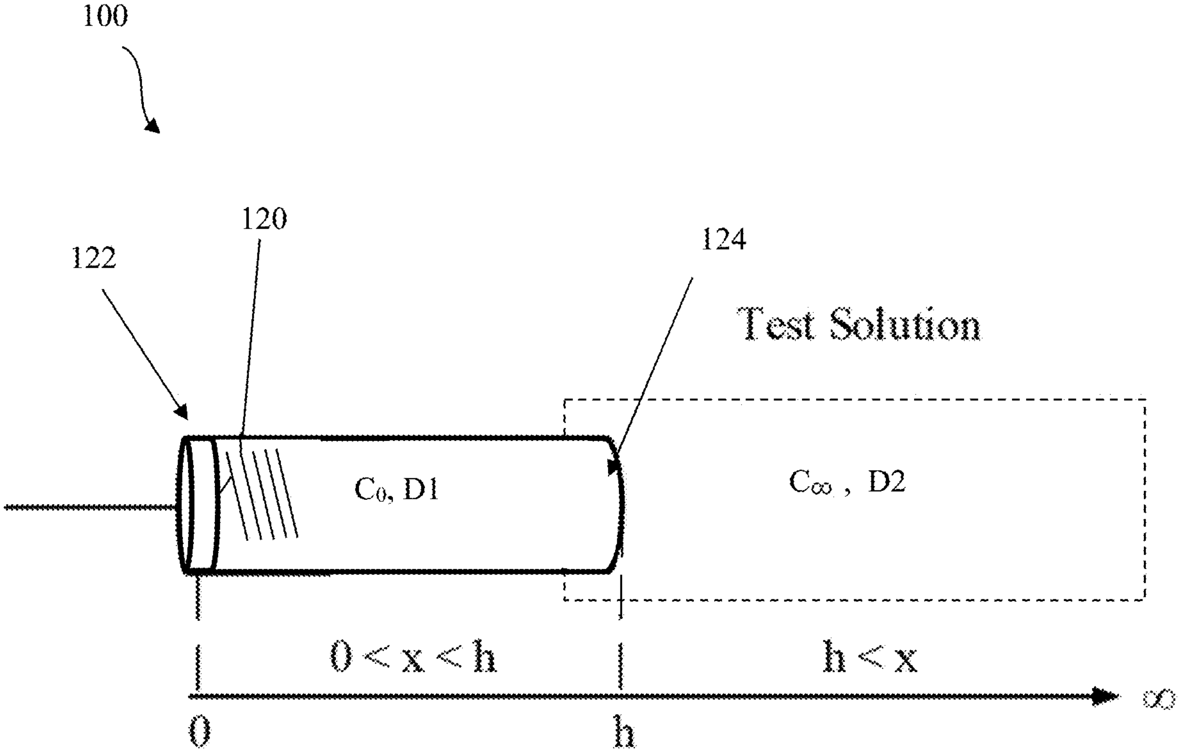
FIG. 1 shows a representation of the 1D diffusion problem of an exemplary reference electrode inside a test solution.
Figure 7:
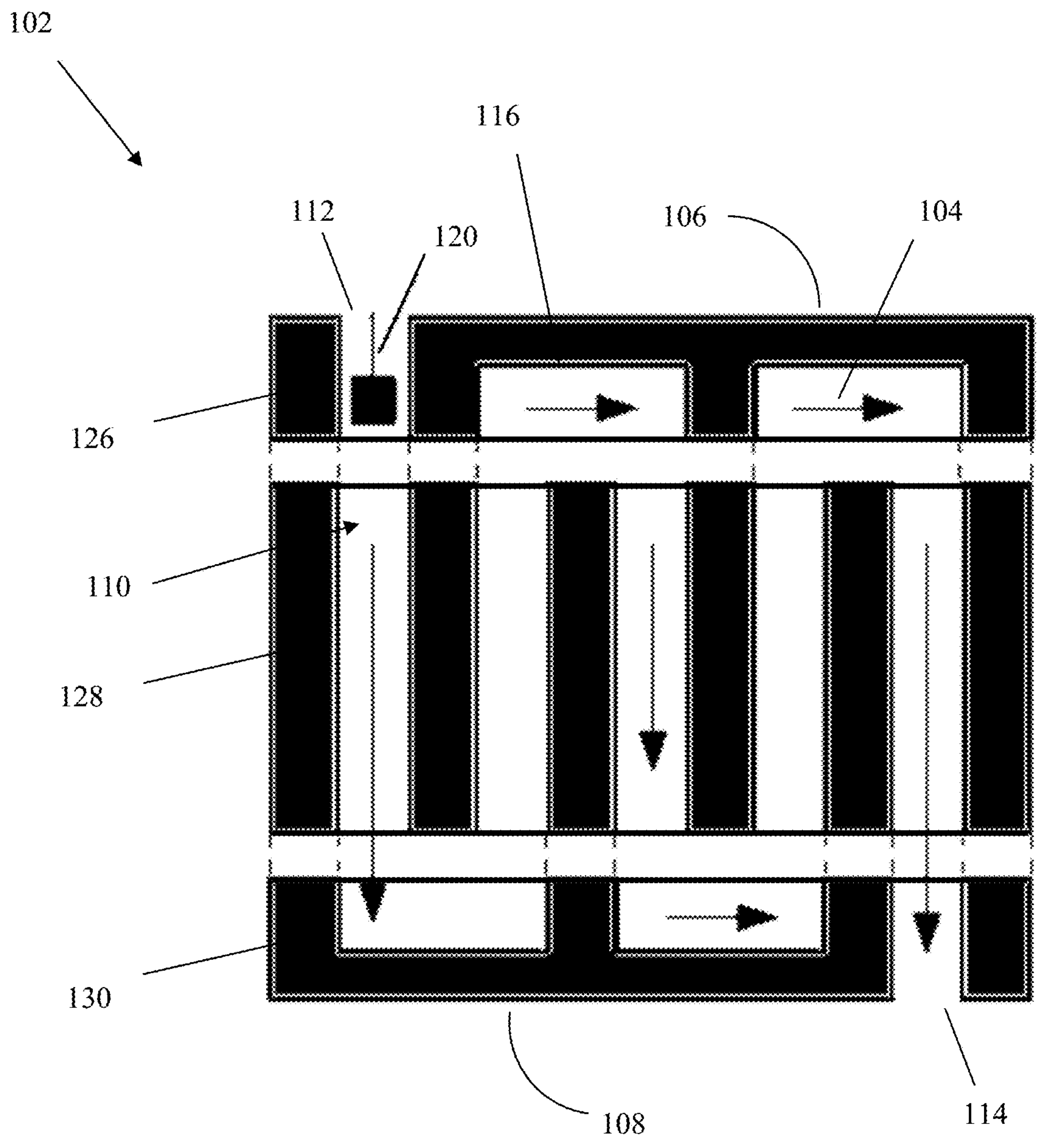
FIG. 7 shows an exemplary 2D design for an embodiment of a reference electrode having a diffusion channel exhibiting a serpentine path profile.
Figure 8:
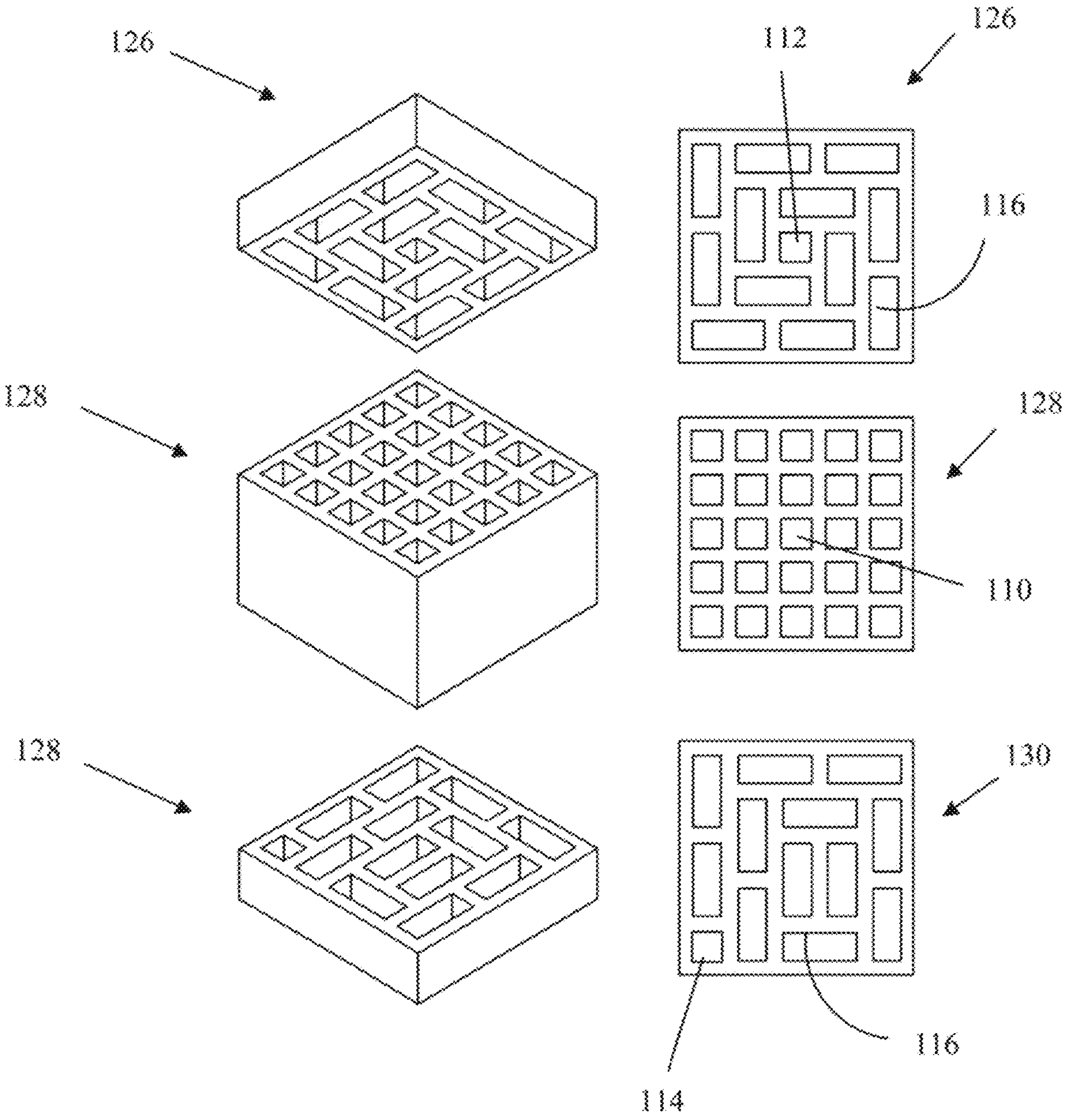
FIG. 8 shows an exemplary 3D design for an embodiment of a reference electrode having a diffusion channel exhibiting a serpentine path profile.

Referring to FIGS. 1 and 7-8, embodiments relate to an electrode housing 102, an electrode 100 made from the electrode housing 102, and methods of making and using the same.

The electrode housing 102 is a structure configured to house solution 104. It is contemplated for the electrode housing 102 to be made from plastic (e.g., acrylonitrile butadiene styrene (ABS)), but other materials can be used. These can include ceramic, polymer (e.g., polyether ether ketone or PEEK), composite material, etc. The electrode housing 102 has a housing first end 106 and a housing second end 108, wherein a length of the electrode housing 102 is defined by a distance between the housing first end 106 and the housing second end 108. The electrode housing 102 has at least one diffusion channel 110 formed within an interior of the electrode housing 102. The diffusion channel 110 has a channel first end 112 (forming an opening in the housing first end 106) and a channel second end 114 (forming an opening in the housing second end 108), wherein a length of the diffusion channel 110 is defined by a distance between the channel first end 112 and the channel second end 114. It is contemplated for the electrode housing 102 to have a single diffusion channel 110, but there can be any number of diffusion channels 110. The diffusion channel 110 can have a cross-sectional shape (e.g., circular, square, rectangular, triangular, hexagonal, etc.). The diffusion channel 110 can have a diameter. The diameter can be constant from the channel first end 112 to the channel second end 114 or can vary at any point along the length of the diffusion channel 110. The diffusion channel 110 can have a path profile defined by the path or route the diffusion channel 110 makes when extending from the housing first end 106 to the housing second end 108. This path profile can be straight, curved, sinusoidal, serpentine, spiral, helical, etc. The diffusion channel 110 has sidewalls 116 defining an interior volume of space that is a conduit for solution 104. The sidewalls 116 of the diffusion channel 110 can have a surface ornamentation (e.g., straight, tapered, stepped, undulating, fluted, etc.). Any portion of the sidewall 116 of a diffusion channel 110 can have a surface ornamentation that is the same or different from a surface ornamentation of another portion of the sidewall 116. In embodiments with plural diffusion channels 110, any one or combination of diffusion channels 110 can have the same or different length, diameter, shape, sidewall surface ornamentation, path profile, etc. than another diffusion channel 110.

In an exemplary embodiment, the electrode housing 102 has a single diffusion channel 110 extending from the housing first end 106 to the housing second end 108, wherein the channel first end 112 forms an opening in the housing first end 106, the channel second end 114 forms an opining in the housing second end 108. The electrode housing 102 has a width and a depth. The diffusion channel 110 extends from the housing first end 106 towards the housing second end 108, makes a turn in the width or depth direction, and then extends towards the housing first end 106. The diffusion channel 110 makes several routes in the length direction and the width and/or depth directions so as to form a serpentine path profile.

If it is desired for the electrode housing 102 to have a long, narrow shape, the path profile will include a path route in the length direction that is longer than a path route in the width and/or the depth direction. This can include the path profile having path routes in the length direction that are, in average, longer than path routes, in average, in the width and/or the depth direction. Thus, if it is desired for the electrode housing 102 to have a long, narrow shape and for the diffusion channel 110 to have a serpentine path profile, the routes in the length direction will be longer (at least one average) than the routes in the width and/or depth directions. If it is desired for the electrode housing 102 to have a short, fat shape, the path profile will include a path route in the length direction that is shorter than a path route in the width and/or the depth direction. This can include the path profile having path routes in the length direction that are, in average, shorter than path routes, in average, in the width and/or the depth direction. Thus, if it is desired for the electrode housing 102 to have a short, fat shape and for the diffusion channel 110 to have a serpentine path profile, the routes in the length direction will be shorter (at least one average) than the routes in the width and/or depth directions. The routes in the length, width, and/or depth directions can be parallel to the length, width, and/or depth directions or at an angle with respect to the length, width, and/or depth directions.

One of the goals of forming the diffusion channel 110 in the manners described herein is to increase the diffusion path between the reference couple 120 of the electrode 100 and the test solution—i.e., increase the length of the diffusion channel 110 from the channel first end 112 (where the reference couple 120 is located) and the channel second end 114 (where the test solution environment is). Design criteria can imposed trade-offs so there may be a need to balance the increase in diffusion length with other operating parameters. For instance, specific applications can impose limits on diffusion channel 110 diameter, the amount of electrode housing 102 material needed to maintain structural integrity (e.g., the more serpentine routes may reduce structural integrity of the housing 102), etc.

As noted herein, the electrode housing 102 can be used as a component of an electrode 100. The electrode can be a reference electrode, for example. The electrode 100 can be a component for, or a component used in conjunction with, a sensor (e.g., potentiometric sensor), an anode, a cathode, a conductor, a membrane, etc. The electrode 100 can have an electrode first end 122 (corresponding with the housing first end 106 and the channel first end 112) and an electrode second end 124 (corresponding with the housing second end 108 and the channel second end 114). With the electrode 100 being a reference electrode, the electrode first end 122 can be equipped with a reference couple 120. The reference couple 120 can be a conductive member inserted in the diffusion channel 110 at the channel first end 112. The reference couple 120 can be a member made from silver/silver chloride, silver/silver halides (e.g., Ag/AgCl), mercury/mercurous salts (e.g., saturated calomel), metal/metal sulfates (e.g., $Cu/CuSO_4$), etc. that have a stable and Nernstian electrode potential. The diffusion channel 110 at the channel second end 114 can be open so as to expose the interior of the diffusion channel 110 to a test solution environment. The diffusion channel 110 includes solution 104. This solution 104 can be referred to as filling solution. The solution 104 is a material that provides the required electrolyte to the reference couple 120 and ionic conductivity to the test solution environment. The solution 104 material can be a water, an ionic-liquid, a gel/polymer, a solid. An exemplary solution 104 is agar/potassium chloride (e.g., agar gel concentrated with KCl electrolyte).

An exemplary method of producing the electrode housing 102 can involve additive manufacturing (e.g., 3D printing) or machining (e.g., computer numerical control or CNC machining) components of the electrode housing 102. The components can then be adhered or otherwise connected together. For instance, the electrode housing 102 can be made of a top component 126, a body component 128, and a bottom component 130. The top component 126 can include the channel first end 112 and may also include some portions of the diffusion channel sidewalls 116. The body component 128 can include the bulk of the diffusion channel 110. The bottom component 130 can include the channel second end 114 and may also include some portions of the diffusion channel sidewalls 116.

Additive manufacturing and/or machining can be used to form the components. Additive manufacturing and/or machining techniques can form the top component 126, the diffusion channel first end 112 and any diffusion channel sidewalls 116. For instance, the top component 126 can be a member having a grid structure formed in a surface thereof, the grid structure being the channel first end 112 and sidewall(s) 116 (or partially formed sidewall(s) 116). The body component 128 can be a member having a diffusion channel(s) 110 formed therein. The top portion of the body component 128 can have partially formed sidewall(s) 116. When the top component 126 is placed in contact with the body component 128 top portion, the partially formed sidewall(s) 116 formed in the top component 126 align with the partially formed sidewall(s) of the body component 128 so that they form a portion of the diffusion channel 110. Similarly, the bottom component 130 can be a member having a grid structure formed in a surface thereof, the grid structure being the channel second end 114 and sidewall(s) 116 (or partially formed sidewall(s)). The body component 128 can be a member having a diffusion channel(s) 110 formed therein. The bottom portion of the body component 128 can have partially formed sidewall(s) 116. When the bottom component 130 is placed in contact with the body component 128 bottom portion, the partially formed sidewall(s) 116 formed in the bottom component 130 align with the partially formed sidewall(s) 116 of the body component 128 so that they form a portion of the diffusion channel 110. Adhesive or other means can be used to secure the component together.

The components, along with the grid structure(s) and diffusion channel(s) 110 can be formed via 3D printing techniques and/or CNC machining techniques. For instance, a digital file representing the geometry of the component, placement and geometries of the diffusion channel(s) 110, and/or placement and geometries of the grid structure(s) can be generated using a digital 3D model such as computer aided drafting (CAD) model, for example. This digital file can be used by a processor of a 3D printing machine to build the component in layers, wherein as the component is being built the diffusion channel(s) 110 are formed in accordance with the digital file—i.e., the processor uses the digital file to guide a printer and the deposition of layers.

With machining, the digital file can be used by a processor of a CNC machining apparatus to machine out the component from a workpiece or machine out diffusion channel(s) 110 from a component—i.e., the processor uses the digital file to guide a drill, lathe, mill, etc. of the CNC machining apparatus.

The exemplary embodiment discussed and illustrated has three components. However, it should be understood that any number of components can be used—e.g., the housing 102 can be made of a single component, two components, three components, four components, etc. The exemplary embodiment discussed and illustrated has a top, body, and bottom component (i.e., segmented in the length direction). The components can also, or in the alternative, be segments in the width or depth direction. While, in the exemplary embodiment, each component is discussed and illustrated as having a sidewall 116 portion that, when the components are assembled, form the diffusion channel 110, some components may not have a sidewall 116 or diffusion channel 110 at all. The number of components, how the segments are formed, which portions have diffusion channel(s) 110, etc. will depend on design criteria and particular applications of the electrode housing 102.

The following discussion provides examples and test results for embodiments of an electrode housing 102 and an electrode 100 made from the electrode housing 102.

In this work, we demonstrate mathematically and experimentally that a reference electrode's (RE) operational lifespan is exponentially correlated to the length of the filling solution. The mathematical solution, based on 1D, Fickian diffusion between an RE's filling solution and an infinite test solution, predicts that increasing the length of the filling solution by 1 order of magnitude will increase the lifespan of the RE by 2 orders of magnitude (i.e., from 1 hour to 100 hours.) This exponential dependence was experimentally observed by monitoring the open-circuit potentials of RE's composed of an Ag/AgCl couple and agar-gel filling solutions (agar+1.0 M KCl) inside glass capillaries of different lengths. The 1 cm RE remained stable for 6 hours, whereas a 10 cm RE was stable for approximately 18 days (430 hours).

We also demonstrate that 3D printed and CNC machined RE housings with long and narrow filling solution channels can be used to produce small RE's with enhanced lifetimes. Reference electrodes prepared this way were cheaper, smaller, and more stable than a typical commercial reference electrode design. A 4 cm long, 3D printed RE housing with 3 mL of agar gel filling solution provided over 3 months of electric potential stability.

Reference electrodes (RE) are an integral part of electrochemical experimentation and potentiometric sensors. The primary role of these REs is to maintain a stable and thermodynamically predictable potential while withstanding an application environment. Common factors when designing a reference electrode are the reference couple, the filling solution, and the junction type. The reference couple should give a stable, reproducible, and thermodynamically calculable potential with a known electrochemical half-reaction. While the standard hydrogen electrode provides the standard for all electrochemical potentials, a great variety of reference couples have been historically developed for a number of applications and environments, not limited to silver/silver halides (eg., Ag/AgCl), mercury/mercurous salts (e.g., saturated calomel), and metal/metal sulfates (e.g., $Cu/CuSO_4$). The filling solution can be any phase (water, ionic-liquid, gel/polymer, solid) so long as it provides the required electrolyte to the reference couple and ionic conductivity to the test solution. The junction connecting the filling solution and the analyte is typically designed to limit the diffusion of electrolyte between the two. Junctions can be a hole in the RE housing, a wettable porous frit (e.g., ceramic, glass, wool), or an ionically-conducting liquid or solid phase (e.g., a salt bridge, membrane, thickening agent), and may include valves or microfluidic devices to further limit diffusion.

The expected operational lifetime of the RE depends on its application: a small, disposable reference electrode may only need to be stable for a few hours; a reference electrode for daily lab use may need maintenance once every other week; a reference electrode used in a remote location may need to be stable for months or many years without servicing. In any case, improved stability of the reference electrode improves the reliability and usefulness of electrochemical measurements. Using an aqueous filling solution with excess electrolyte is a common method of preserving the reference couple's potential, as any dilution over time is compensated by the excess salt. When an excess salt is not practical (e.g., some solid or gel phases) it is commonly assumed that a larger volume of filling solution/electrolyte will increase the lifespan of the reference electrode. Neither of these options are preferable when monitoring a small volume of analyte, as the reference electrode would quickly contaminate the analyte. For these reasons, research on low-profile, long-lasting reference electrodes typically focuses on using novel materials and fabrication methods for the filling solution and junction.

Despite the advances in RE materials and designs, no effort has been made in predicting RE lifetimes based on how design parameters impact the RE degradation mechanisms. In this work, we model the lifetime of an RE based on 1D Fickian diffusion, and use the results to develop low-profile, long-lasting reference electrodes.

To determine the influence of diffusion of electrochemically active species on the stability of an RE (i.e., diffusion of $Cl^-$ on the potential of the Ag/AgCl couple) we solved the 1D diffusion problem shown in FIG. 1. The RE includes an arbitrary reference couple housed at the end of a filling solution of length h, which openly connects to the test solution (open junction). The diffusion coefficient of the active species in the filling and test solutions are $D_1$ and $D_2$, and the initial concentration of active species in the RE and test solution are $C_0$ and $C_\infty$, respectively. The solution assumes that the test solution extends into infinity.

FIG. 1 shows a representation of the 1D diffusion problem of an RE inside a test solution. The following derivation combines J. Crank's "The Mathematics of Diffusion" (1975) sections 2.2 and 3.5 for the solution of a composite media with an extended initial distribution assuming constant diffusion coefficients. A general solution to Fick's $2^{nd}$ law:

$$\frac{\partial C}{\partial t} = D\frac{\partial^2 C}{\partial x^2}, \tag{1}$$

for a plane source can be written as $$C(x, t) = A\frac{1}{\sqrt{t}}e^{-x^2/4Dt}, \tag{2}$$

where A is a parameter to be solved given the initial and boundary conditions and D is the diffusion coefficient. If we formulate the problem such that a finite phase 1 is sandwiched between two identical phase 2's and contained within the boundary −h<x<h, the concentration profile for the diffusing species is given as the piecewise function in Eq. (3):

$$C(x, t) = \begin{cases} C_{2-}(x, t) & x \le -h \\ C_1(x, t) & -h < x < h \\ C_{2+}(x, t) & x \ge h \end{cases} \tag{3}$$

Figure 2:
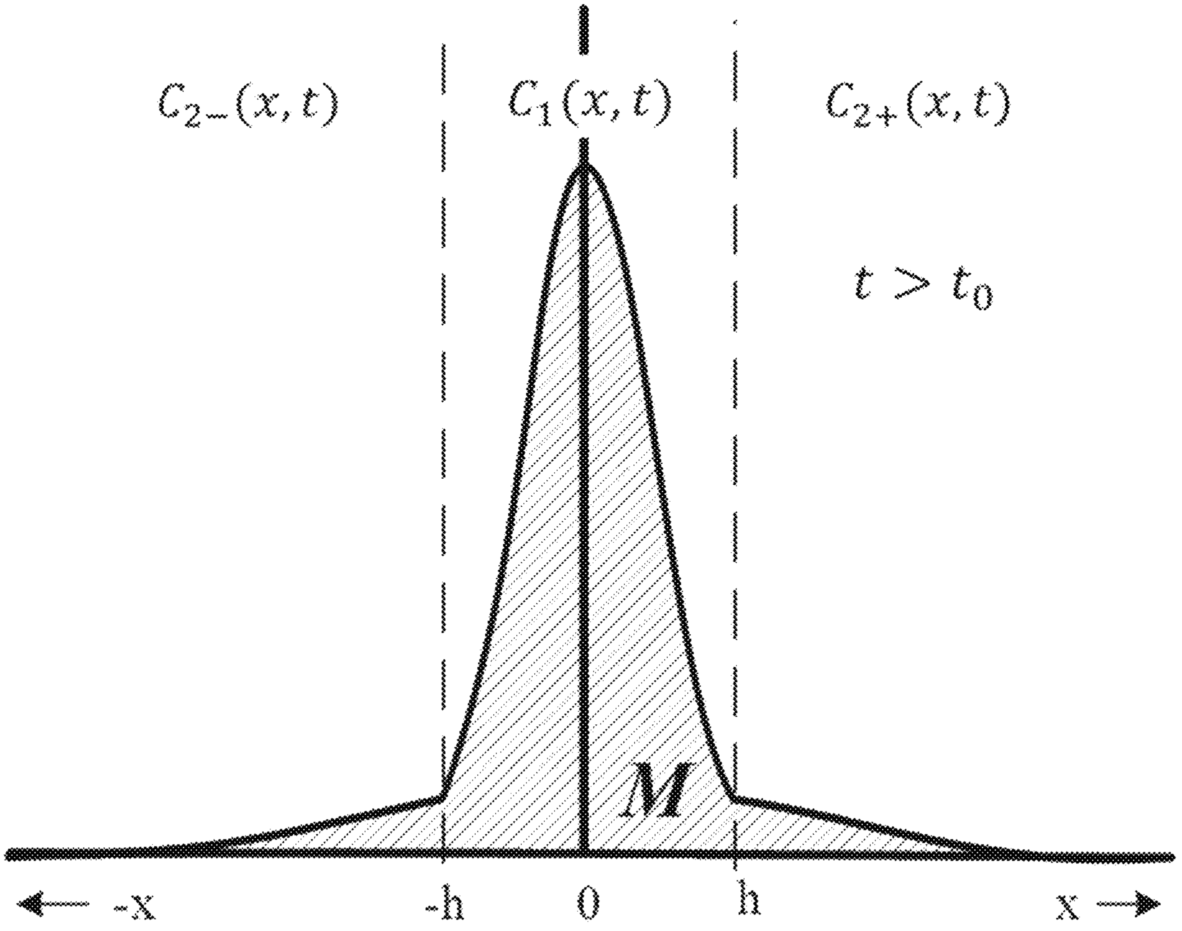
FIG. 2 demonstrates a distribution for a line source at x=0.

FIG. 2 demonstrates this distribution for a line source at x=0. Eq. (4) then ensures that the total mass M for the system is conserved:

$$M = \int_{-\infty}^{-h} C_{2-}(x, t)dx + \int_{-h}^{h} C_1(x, t)dx + \int_{h}^{\infty} C_{2+}(x, t)dx \tag{4}$$

More specifically, FIG. 2 shows a 1D concentration profile of a plane source at x=0 at some time $t>t_0$ where diffusion for −h<x<h is defined by $C_1$(x, t), for x≤−h is defined by $C_{2-}$(x, t), and for x≥h is defined by $C_{2+}$(x, t). The area underneath the curve is the total mass M for all times t.

If the line source originates at point ξ, the general mass conservation equation becomes $$M = \frac{1}{\sqrt{t}}\left(\int_{-\infty}^{-h} A_{2-}e^{-(x-\xi)^2/4D_2t}dx + \int_{-h}^{h} A_1 e^{-(x-\xi)^2/4D_1t}dx + \int_{h}^{\infty} A_2 e^{-(x-\xi)^2/4D_2t}dx\right), \tag{5}$$

where $D_1$ and $D_2$ are the diffusion coefficients for phases 1 and 2, and there are now 3 parameters to solve for ($A_{2-}$, $A_1$, and $A_{2+}$). Boundary conditions at each interface (x=−h and x=h) complete the system of equations:

$$k = \frac{C_{2-}(-h, t)}{C_1(-h, t)}, \tag{6}$$

$$k = \frac{C_{2+}(h, t)}{C_1(h, t)}. \tag{7}$$

k in Eq.'s (6) and (7) is the partitioning coefficient of the diffusing species between each phase (i.e., when k=1, the concentration is equal on both sides of the interface h.) The system of equations (5), (6), and 7 can then be solved, giving:

$$A_1 = \frac{1}{\sqrt{\pi}}\frac{M}{\sqrt{D_1}\left\{\operatorname{erf}\left(\frac{h+\xi}{2\sqrt{D_1 t}}\right) + \operatorname{erf}\left(\frac{h-\xi}{2\sqrt{D_1 t}}\right)\right\} + \sqrt{D_2}\,ke^{\frac{(h-\xi)^2(D_1-D_2)}{4tD_1D_2}}\operatorname{erfc}\left(\frac{h-\xi}{2\sqrt{D_2 t}}\right) + \sqrt{D_2}\,ke^{\frac{(-h-\xi)^2(D_1-D_2)}{4tD_1D_2}}\operatorname{erfc}\left(\frac{h-\xi}{2\sqrt{D_2 t}}\right)}, \tag{8.a}$$

$$A_{2-} = A_1 ke^{\frac{(h-\xi)^2(D_1-D_2)}{4tD_1D_2}}, \tag{8.b}$$

$$A_{2+} = A_1 ke^{\frac{(-h-\xi)^2(D_1-D_2)}{4tD_1D_2}}. \tag{8.c}$$

Here, erf(x) and erfc(x) are the error function and its complement (erfc(x)=1−erf(x)). Combining equations (2) and (3) with this solution gives the 1D concentration profile of a line source of mass M at x=ξ:

$$C(x, t, \xi) = \frac{M}{\sqrt{\pi t}} \times e^{-(x-\xi)^2/(4D_2t)}\frac{\Theta(-x-h)ke^{\frac{(-h-\xi)^2(D_1-D_2)}{4tD_1D_2}} + \Theta(x-h)ke^{\frac{(h-\xi)^2(D_1-D_2)}{4tD_1D_2}} + \{\Theta(x+h)-\Theta(x-h)\}ke^{\frac{(x-\xi)^2(D_1-D_2)}{4tD_1D_2}}}{\sqrt{D_1}\left\{\operatorname{erf}\left(\frac{h+\xi}{2\sqrt{D_1 t}}\right) + \operatorname{erf}\left(\frac{h-\xi}{2\sqrt{D_1 t}}\right)\right\} + \sqrt{D_2}\,ke^{\frac{(h-\xi)^2(D_1-D_2)}{4tD_1D_2}}\operatorname{erfc}\left(\frac{h-\xi}{2\sqrt{D_2 t}}\right) + \sqrt{D_2}\,ke^{\frac{(-h-\xi)^2(D_1-D_2)}{4tD_1D_2}}\operatorname{erfc}\left(\frac{h+\xi}{2\sqrt{D_2 t}}\right)}. \tag{9}$$

In Eq. (9), the Heaviside function Θ(x) substitutes the piecewise format of Eq. (3). The initial conditions are given as: $C(x,0)=C_0$ for −h<x<h and C(x, 0)=0 for x≤−h and x>h. Allowing the total mass M to be sourced by successive elements of width δξ and concentration $C_0$ over the interval −h<x<h, we get the integral:

$$C(x,t) = \frac{C_0}{\sqrt{\pi t}} \int_{-h}^{h} \frac{\left[\Theta(-x-h)ke^{\frac{(-h-\xi)^2}{4tD^*}} + \Theta(x-h)ke^{\frac{(h-\xi)^2}{4tD^*}} + \{\Theta(x+h) - \Theta(x-h)\}ke^{\frac{(x-\xi)^2}{4tD^*}}\right] e^{-(x-\xi)^2/(4D_2 t)}}{\sqrt{D_1}\left\{\operatorname{erf}\left(\frac{h+\xi}{2\sqrt{D_1 t}}\right) + \operatorname{erf}\left(\frac{h-\xi}{2\sqrt{D_1 t}}\right)\right\} + \sqrt{D_2}\,k\left\{e^{\frac{(h-\xi)^2}{4tD^*}}\operatorname{erfc}\left(\frac{h-\xi}{2\sqrt{D_2 t}}\right) + e^{\frac{(-h-\xi)^2}{4tD^*}}\operatorname{erfc}\left(\frac{h+\xi}{2\sqrt{D_2 t}}\right)\right\}} d\xi, \tag{10}$$

with $$D^* = \frac{D_1 D_2}{D_1 - D_2}. \tag{11}$$

Finally, if phase 2 has an initial concentration $C_\infty$, the solution is shifted $$C(x,t) = \frac{C_0 - C_\infty}{\sqrt{\pi t}} H(x,t) + C_\infty, \tag{12}$$

where H(x, t) is the integral in Eq. (10). Eq. (12) is the complete solution to the 1D diffusion problem. Since the solution is symmetrical at x=0, there is zero flux of diffusing species across x=0. If the phases are identical (k=1 and $D_1=D_2$) and $C_\infty=0$, the solution simplifies to:

$$C(x,t) = \frac{C_0}{\sqrt{\pi t}} \int_{-h}^{h} \frac{e^{-(x-\xi)^2/(4Dt)}}{2\sqrt{D}} d\xi, \tag{13}$$

which is equivalent to (see Eq 3.12 in Crank (1975)):

$$C(x,t) = \frac{C_0}{2}\left(\operatorname{erf}\frac{h-x}{2\sqrt{Dt}} + \operatorname{erf}\frac{h+x}{2\sqrt{Dt}}\right). \tag{14}$$

Comparing Eq. (12) to the RE problem shown in FIG. 1, the electrode couple is located at x=0, phase 1 is the RE's filling solution with an initial concentration $C_0$, and phase 2 is the test solution with initial concentration $C_\infty$.

The lifetime of the RE depends on the stability of its reference potential $E_{RE}$, which is directly correlated to the concentration of electrochemically active species at the electrode C(0, t). By using the Nernst equation, the open circuit potential of the RE vs. an identical electrode in the test solution will indicate how the RE is changing due to diffusion:

$$E_{OCP}(t) = E_{RE}(t) - E_{test} = -2.303\frac{RT}{nF}\log\left[\frac{C(0,t)}{C_\infty}\right]. \tag{15}$$

Figure 3:
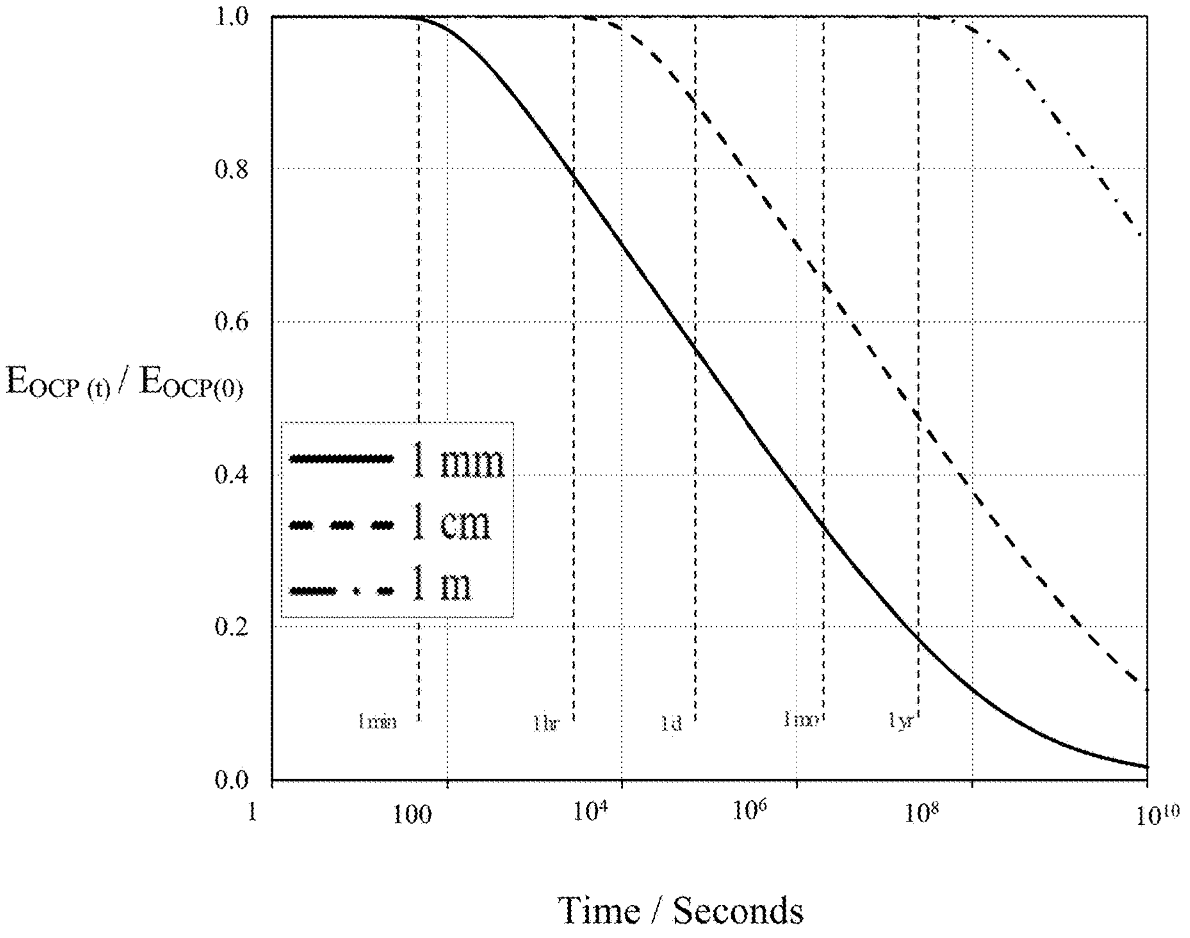
FIG. 3 shows solution results for the influence of the filling solution's length.
Figure 4:
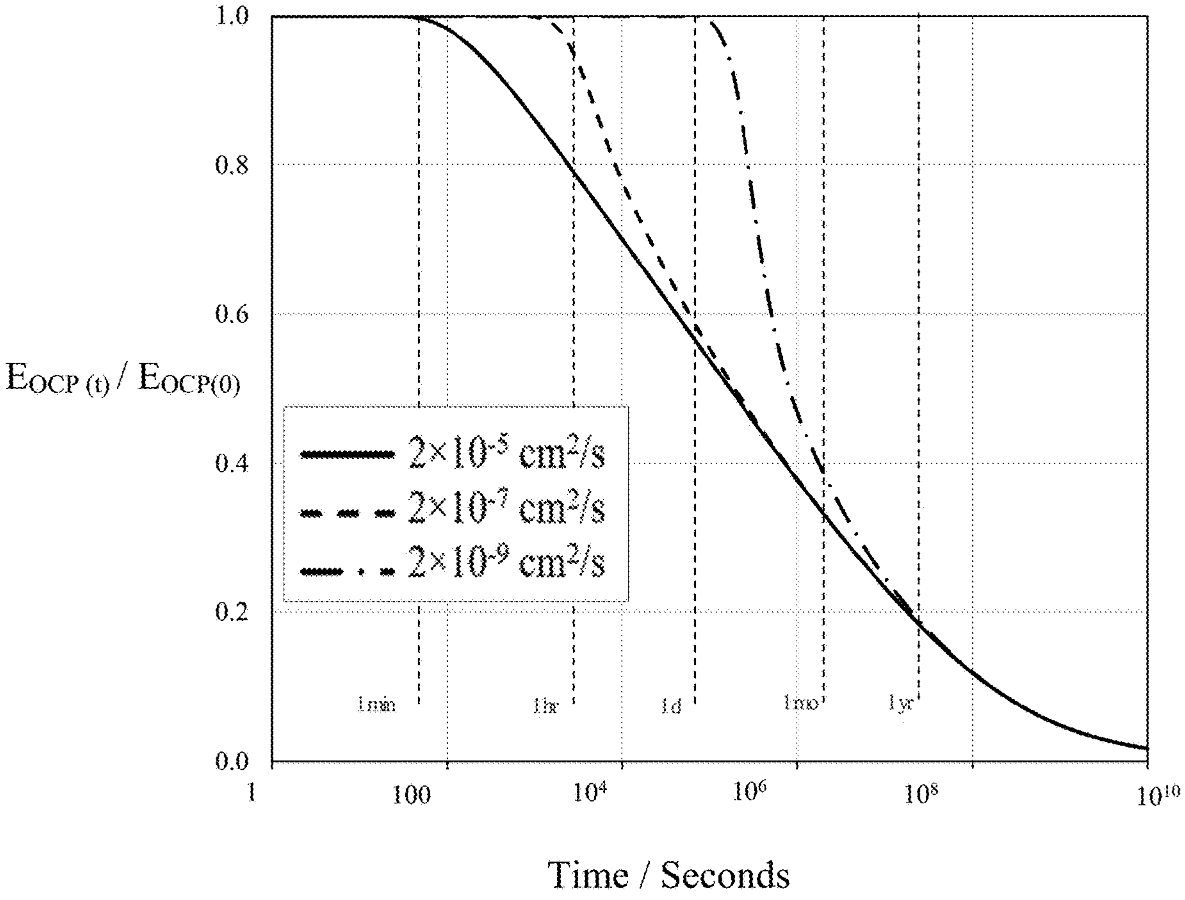
FIG. 4 shows diffusion coefficient results on stability of an exemplary reference electrode's open circuit potential.

Eq. (15) assumes unity activity coefficients. Once the RE is immersed in the test solution, C(0, t) should remain constant until the electrolyte's diffusion front reaches the reference couple. From here, the lifetime of the reference electrode is quantified as some time at which the open circuit potential changes significantly from its initial value. Using Mathematica software, the change in $E_{OCP}$ can be plotted over time for different RE design parameters. The easiest design parameters to control are the diffusion coefficient of the filling solution $D_1$ (e.g., using a different gel/solid phase), and the length h (e.g., creating a longer RE housing.) FIGS. 3-4 show how this solution predicts the RE's stability will change over time with different values for these parameters. The electrolyte's diffusion front reaches the reference couple's surface when $E_{OCP}(t)/E_{OCP}(0)<0$, at which point the results in FIGS. 3-4 show that the diffusion front takes longer to reach the reference couple when (1) the distance (h) is increased and (2) the rate of diffusion is slowed down ($D_1$). In both FIGS. 3 and 4, $C_0=1$, $C_\infty=0.01$, k=1, and $D_2=2\times10^{-5}$ cm$^2$/s. FIG. 3 graph uses a constant filling solution coefficient of $D_1=2\times10^{-5}$ cm$^2$/s; FIG. 4 graph uses a constant filling solution length of h=1 mm.

By decreasing $D_1$ by 4 orders of magnitude, the stability increases from 1 minute to 1 day for a 1 mm RE. Alternatively, increasing h by 3 orders of magnitude increases the stability from 1 minute to 1 year. In addition, increasing h effectively extends the diffusion front, providing a much more gradually change in potential over time than does varying the diffusion coefficient. Based on FIGS. 3 and 4 and Eq.'s (12) through (15), a very crude correlation between the RE lifetime and its design can be identified:

$$t_{life} \propto \frac{\log h}{\log\sqrt{D_1}}. \tag{16}$$

As h appears to have the largest influence on the RE lifetime, we focus on experimentally validating the influence of h on RE lifetime.

Several RE designs were prepared to test h's influence on the RE lifetime. Each RE design uses the Ag/AgCl reference electrode couple, which is chosen for its widespread use and simple preparation. In addition, all designs use an Agar gel concentrated with KCl electrolyte for the filling solution in order to eliminate electrolyte leakage due to convection. Using KCl as the electrolyte minimizes artefacts due to the diffusion potential, as the $K^+$ and $Cl^-$ ions have similar conductivities.

To prepare all Ag/AgCl couples, silver wires (0.5 mm radius) were coiled five times around a 1 mm ceramic tube. The non-coiled section was isolated from the test solutions using PTFE shrink tubing. The wires were then cleaned in hot nitric acid for several minutes. AgCl was electrodeposited on the coils by applying a 1 mA/cm$^2$ anodic current against a platinum plate counter electrode inside of a 1 M HCl solution for 20 minutes. The Ag/AgCl electrodes were then temporarily stored in distilled water+AgCl salt until use.

Figure 5:
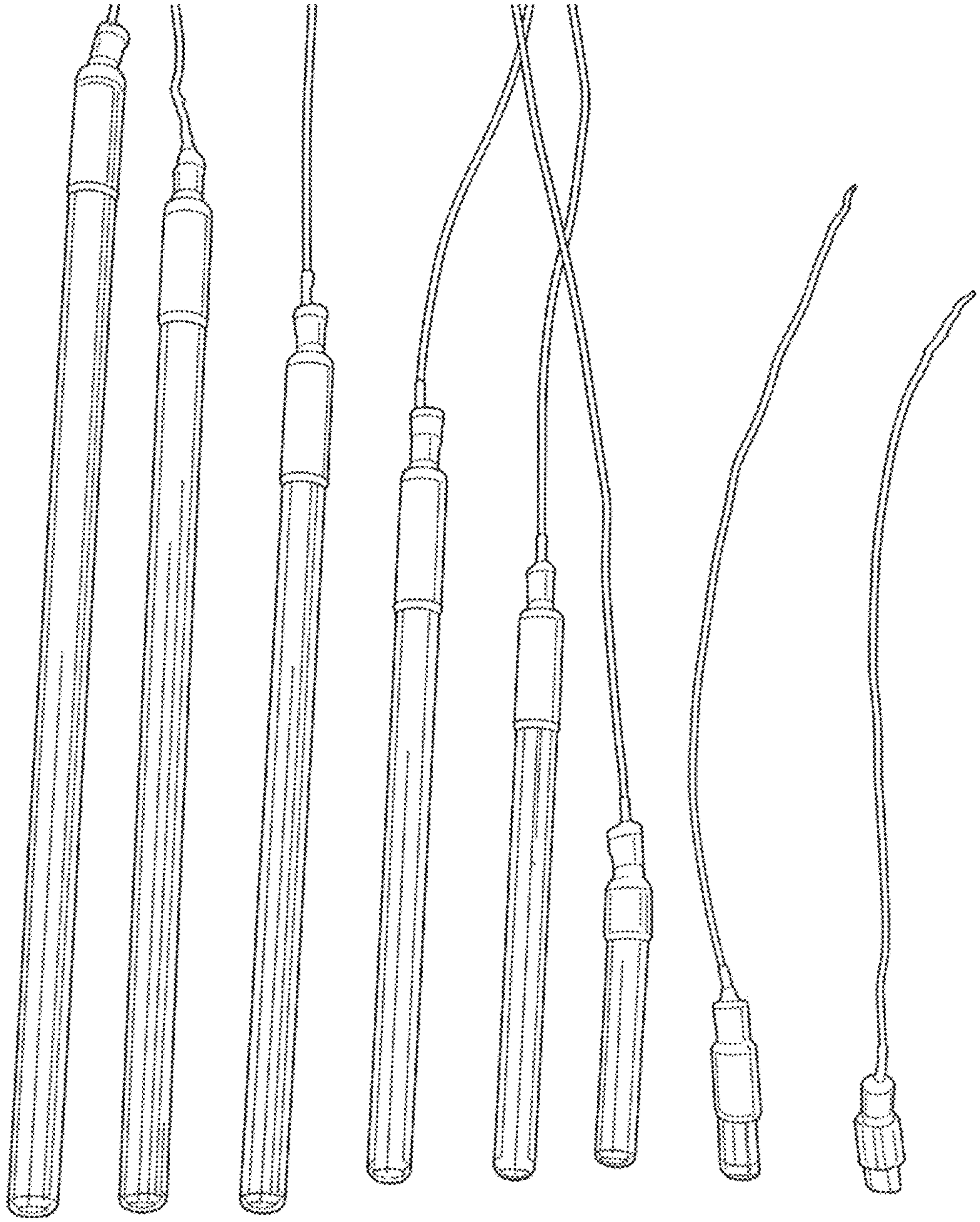
FIG. 5 shows exemplary glass tube RE's.

FIG. 5 shows exemplary glass tube RE's. 4 mm I.D. glass tubes were cut into 1, 2, 4, 8, 10, 12, 14, and 16 cm segments using a diamond-bit Dremel. One end of each glass tube was given a short section of shrink tubing to support the Ag/AgCl electrodes. The Ag/AgCl electrodes were pulled through the glass tubes and sealed at the back using epoxy (Loctite Marine Epoxy). FIG. 5 shows the finished glass RE's. The agar filling solution was prepared by heating 60 mL of 1 M KCl solution to a simmer, then adding 1.8 g of Agar powder (Alfa Aesar) and stirred until the solution became homogeneous. The hot solution was then poured over the glass containers until they were completely filled. Any air bubbles were removed through reheating the RE's and filling with more agar solution. The RE's cooled inside the agar solution, then stored in 1 M KCl until use.

Figure 6:
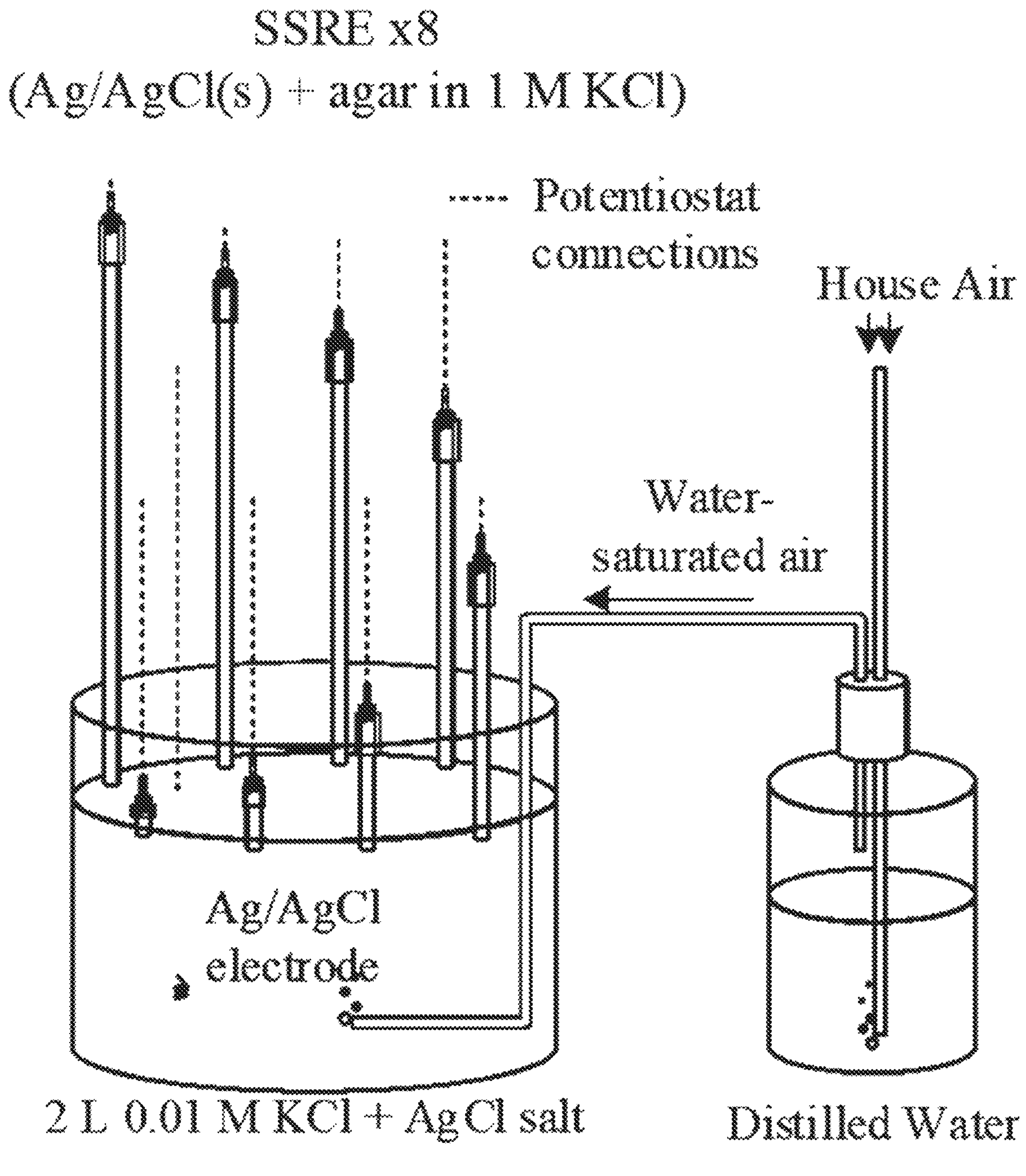
FIG. 6 shows an exemplary test setup for diffusion length versus stability of tube reference electrode tests.

FIG. 6 shows an exemplary test setup for diffusion length vs. stability of the tube RE tests. The eight RE's were evenly spaced (exposed agar facing down) inside a 2 L container. The container was partially filled with 0.01 M KCl+AgCl salt without yet touching the RE's. Water-saturated air was slowly bubbled into the system to prevent evaporation. The bare Ag/AgCl reference electrode was positioned towards the bottom of the container. A Gamry Potentiostat and multiplexer were used to monitor the open circuit potential of all eight RE's against the bare reference electrode over the course of the experiment. To begin the experiment, the bath was slowly filled with the remaining 0.01 M KCl solution until the test solution touched the RE's, at which point testing immediately began. This test ran for 35 days. The test solution was replaced after 15 days and 30 days with new solution of the same composition.

FIG. 7 shows an exemplary 2D design concept for a serpentine RE. FIG. 8 shows an exemplary 3D design concept for a serpentine RE. 3D printing and machining methods can be used to fit long diffusion paths inside a small volume. The concept is presented in 2D in FIG. 7, where a long diffusion channel for an RE is created by affixing three simple shapes: (1) the top, where the Ag/AgCl couple sits inside a small pocket and small slots provide connecting diffusion channels, (2) the middle, a simple grid structure with straight cavities, and (3) the bottom, with connecting slots and a straight hole (outlet) for the filling solution to contact the test solution. This can easily be extended in three dimensions, such as the design shown in FIG. 8. So long as the cavity walls are non-porous, this simple design creates long diffusion paths for the RE within a small volume.

Figure 9:
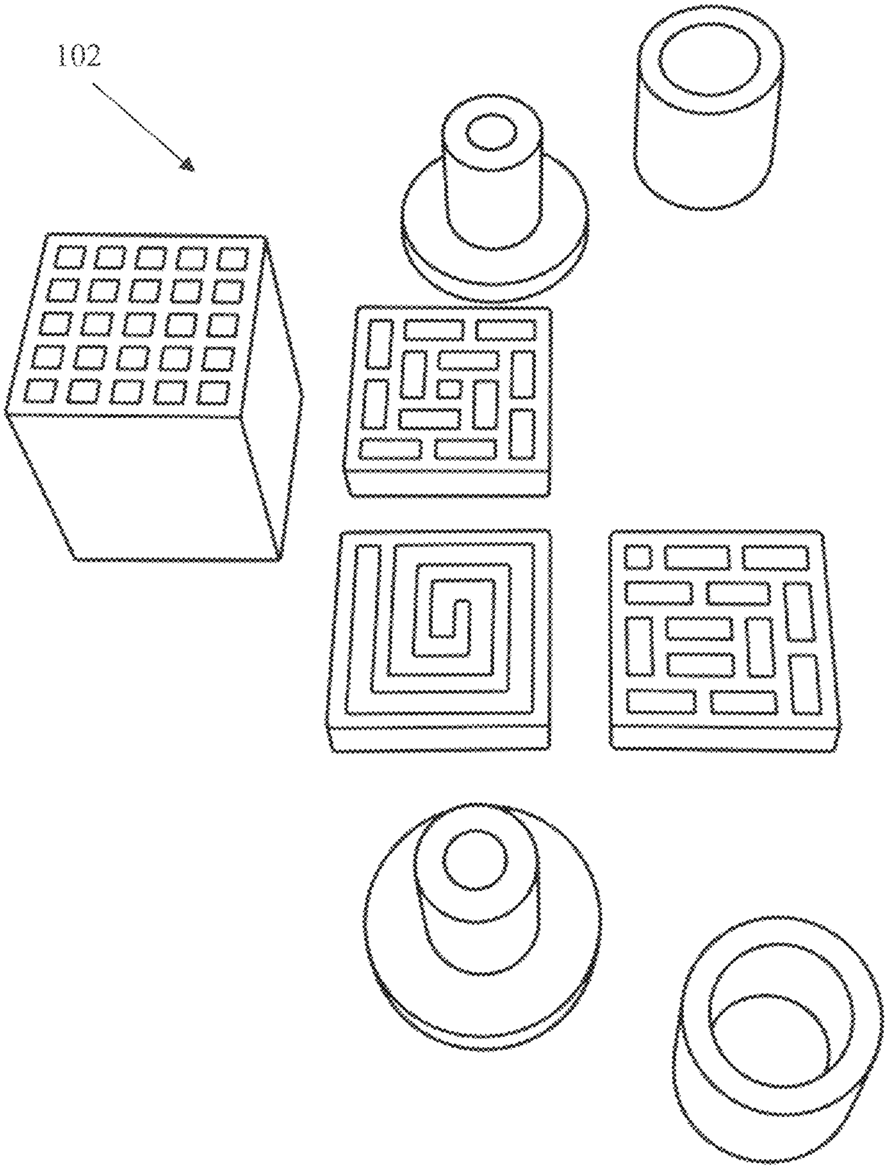
FIGS. 9-11 show exemplary reference electrode housing components created using 3D printed ABS plastic (FIG. 9) and CNC milled PEEK material (FIG. 10), and the finished reference electrode housings (FIG. 11).
Figure 11:
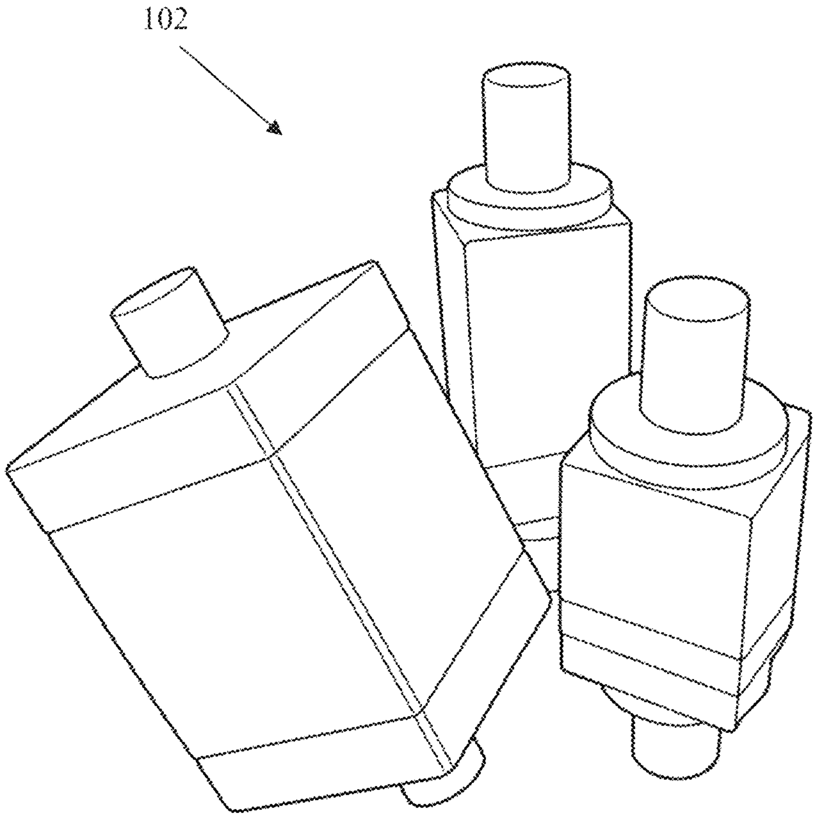

The 3D design with several additional parts were 3D printed using acrylonitrile butadiene styrene (ABS) plastic, shown in FIG. 9. Among the additional parts are a spiral pattern for the bottom (to re-center the outlet hole), and tube connections and caps for both the inlet and outlet. Each of these parts are quickly dipped in acetone, shaking the excess off, to melt the pores from the printing process and adhere the pieces together. The full structure is placed in an acetone vapor bath for 30 minutes for smoothing the surfaces and cavities, then placed in an area with good ventilation to dry off the remaining acetone. Two housing designs for the RE prepared this way are shown in FIG. 11, where each cavity is 2×2 mm wide, the middle (grid) parts are 10, 20, and 30 cm long, and the total cavity lengths are approximately 50 and 75 cm.

Figure 10:
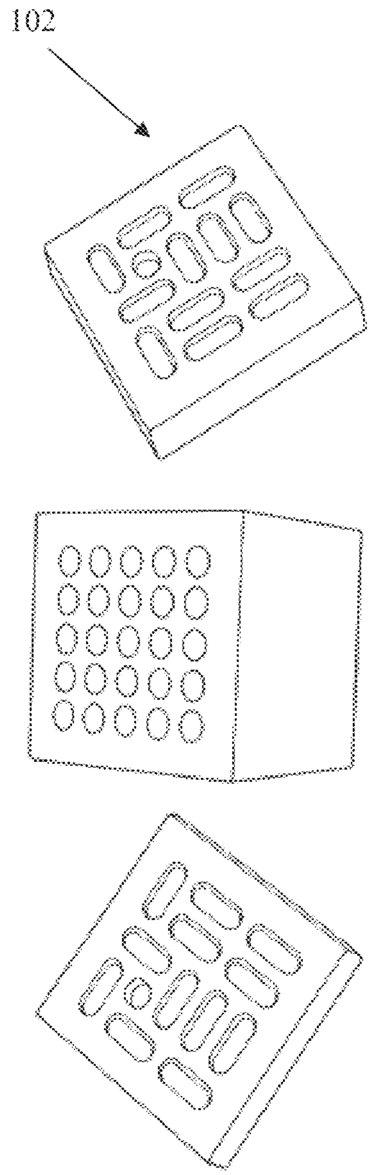

Computer numerical control (CNC) milling was used to produce a similar RE housing with PEEK material in 3 pieces, shown in FIG. 10. The layers were adhered together using epoxy and allowed to dry at room temperature for 24 hours. The cavities are $\frac{1}{8}^{th}$ inch in diameter (0.318 cm) with an approximate total length of 70 cm.

The agar filling gel is prepared in a double boiler, where 1.0 mol $kg^{-1}$ KCl+saturated AgCl salt is first brought to 90° C., then 3% agar powder is added, vigorously stirred, and allowed to cool to 60° C. For each RE, a Ag/AgCl electrode couple is inserted and tied to the housing inlet. The housing outlets are fitted to a large syringe, which is used to pull the hot agar solution through the serpentine paths. The filled housings are left to cool inside the agar solution as the gel solidifies. After reaching room temperature, the REs are removed from the block of solidified agar gel. The inlets are capped with plastic and sealed with epoxy (Loctite Marine Epoxy), and the RE's are ready for testing.

Long-term open circuit potential tests for the 3D printing and CNC milling designs were done in a sealed glass vessel connected to a 10 L container of 0.01 M KCl solution. A bare Ag/AgCl couple was used as the reference electrode in each test. A commercial Ag/AgCl reference electrode (Aldrich® glass reference electrode) was tested over time as a comparison in the same environment. Periodic conductivity measurements were taken with a conductivity meter (Oakton CON 550 Benchtop Conductivity Meter) to ascertain a stable concentration of KCl in the solution. These tests were carried out over the course of several months, and the test solution was refreshed every few days.

Figure 12:
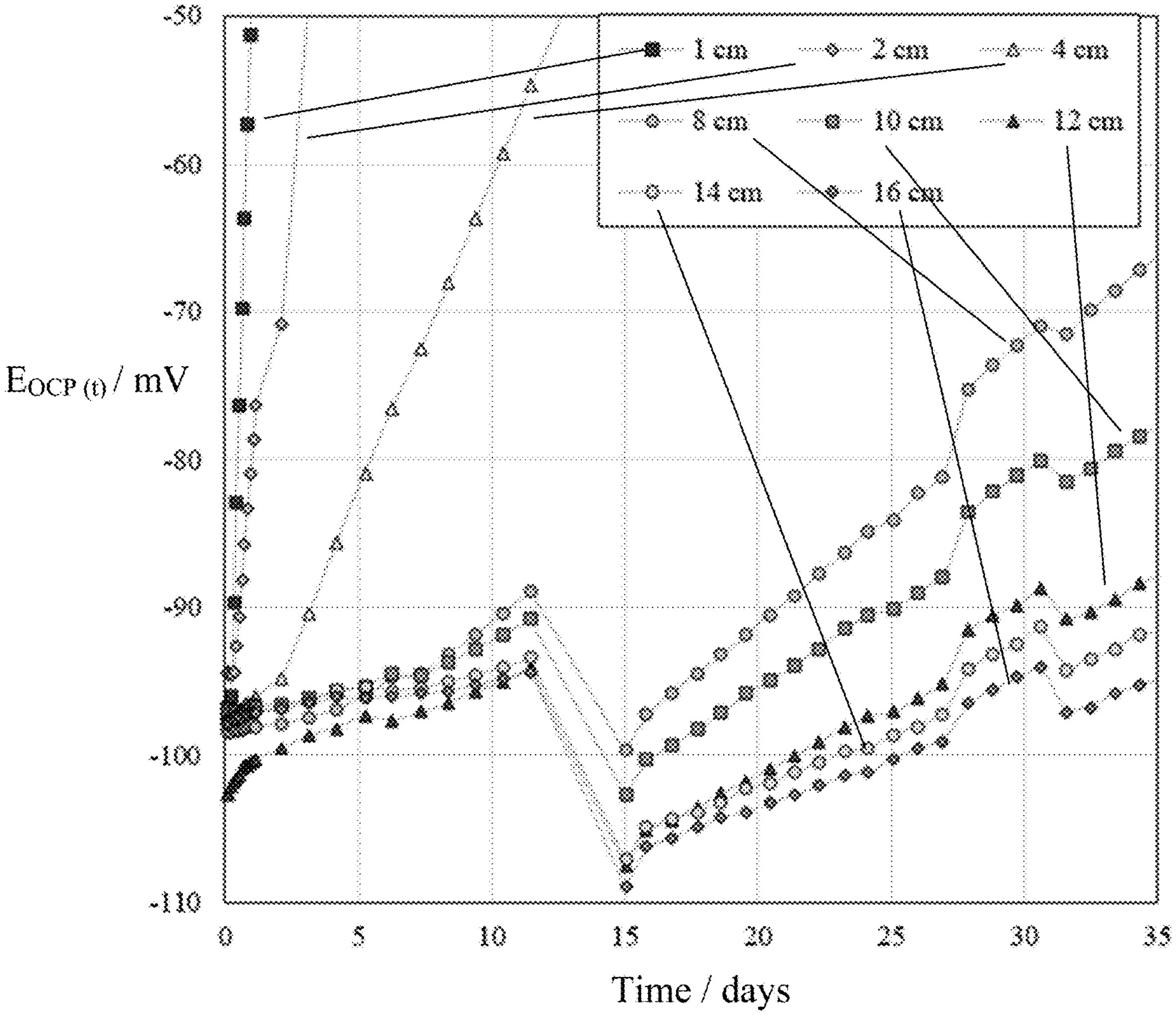
FIG. 12 shows open Circuit potential over time for glass tube reference electrode.
Figure 13:
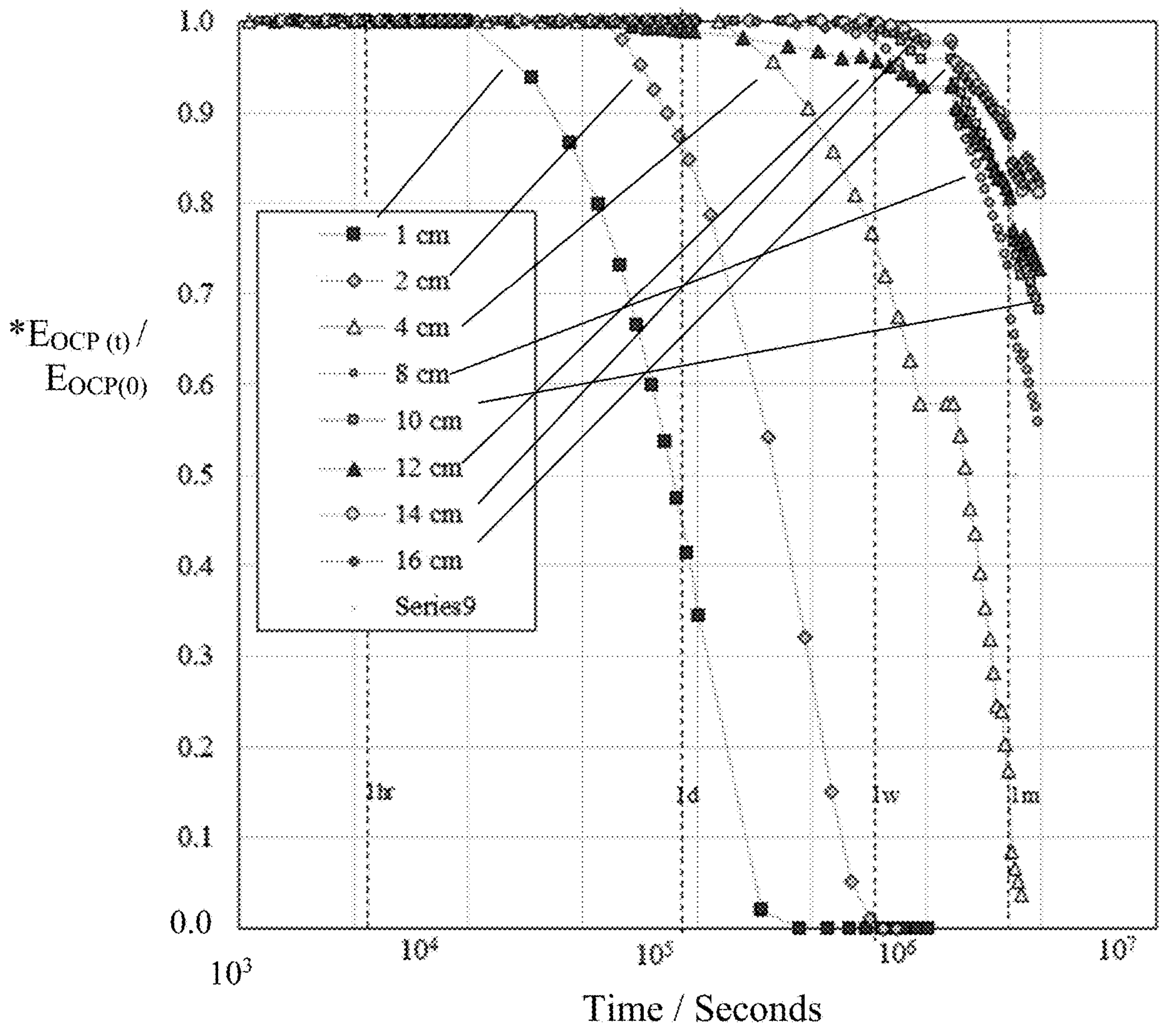
FIG. 13 shows change in open circuit potential over time for a glass tube reference electrode in 0.01 M KCl solution.
Figure 14:
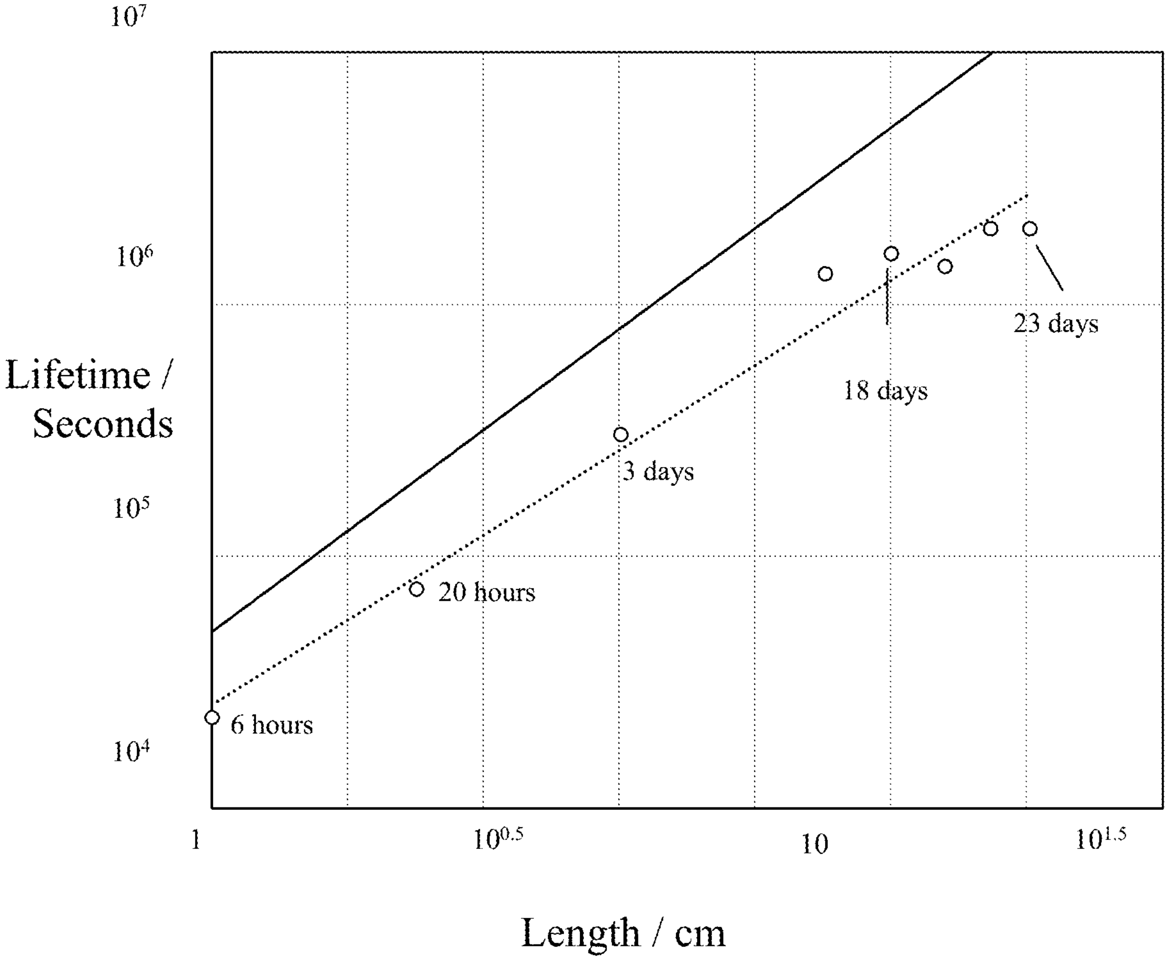
FIG. 14 shows approximate lifetimes of glass tube reference electrodes as a function of length.

The results of long-term tests for the eight glass-tube RE's are shown in FIGS. 12 and 13. At day 15, the testing solution was renewed, which caused a negative potential shift in the data (see FIG. 12). To remove this artefact from the analysis (and highlight changes due to RE degradation), data presented in FIGS. 13 and 14 are re-shifted (positively) for t>=15 days. It is immediately clear that the longer tubes retain a constant potential for a longer period of time. FIG. 12 highlights the different slopes of potential over time for each RE, showing that longer tubes show slower movement in potential (which may be correlated to longer lifetimes). FIG. 12 shows open Circuit potential over time for the glass tube RE's. Measurements are against a bare Ag/AgCl electrode in 0.01 M KCl solution. The jump in day 15 is due to renewing the test solution. FIG. 13 shows change in open circuit potential over time for the glass tube RE in 0.01 M KCl solution. *Data from t=15 days on are shifted to highlight the degradation of the RE's. FIG. 14 shows approximate lifetimes of the glass tube RE's as a function of length. Lifetime was taken at $*E_{OCP}(t)/E_{OCP}(0)=0.9$. In FIG. 14, the lifetime of each tube RE is approximated as the time at which $E_{OCP}(t)/E_{OCP}(0)=0.9$, or around 90% of its initial value. Lifetimes determined this way followed a linear trend in the Log-Log plot of $10^{t_{life,exp}}=4.4+1.7\times10^{h}$. This experimental trend is very similar to the theoretical prediction's trend of $10^{t_{life,pred}}=4.2+2\times10^{h}$, both of which are shown in FIG. 14. In general, the experimental lifetimes are shorter than those predicted from the theory. This may be due to the non-ideality of the agar phase as the filling solution, heterogeneity of KCl concentration within the agar gel, changing diffusion coefficients due to concentration changes, or a non-Fickian diffusion mechanism. In any case, the experimental results generally corroborate the theoretical trends and lifetime predictions due to the RE's diffusion-length.

Figure 15:
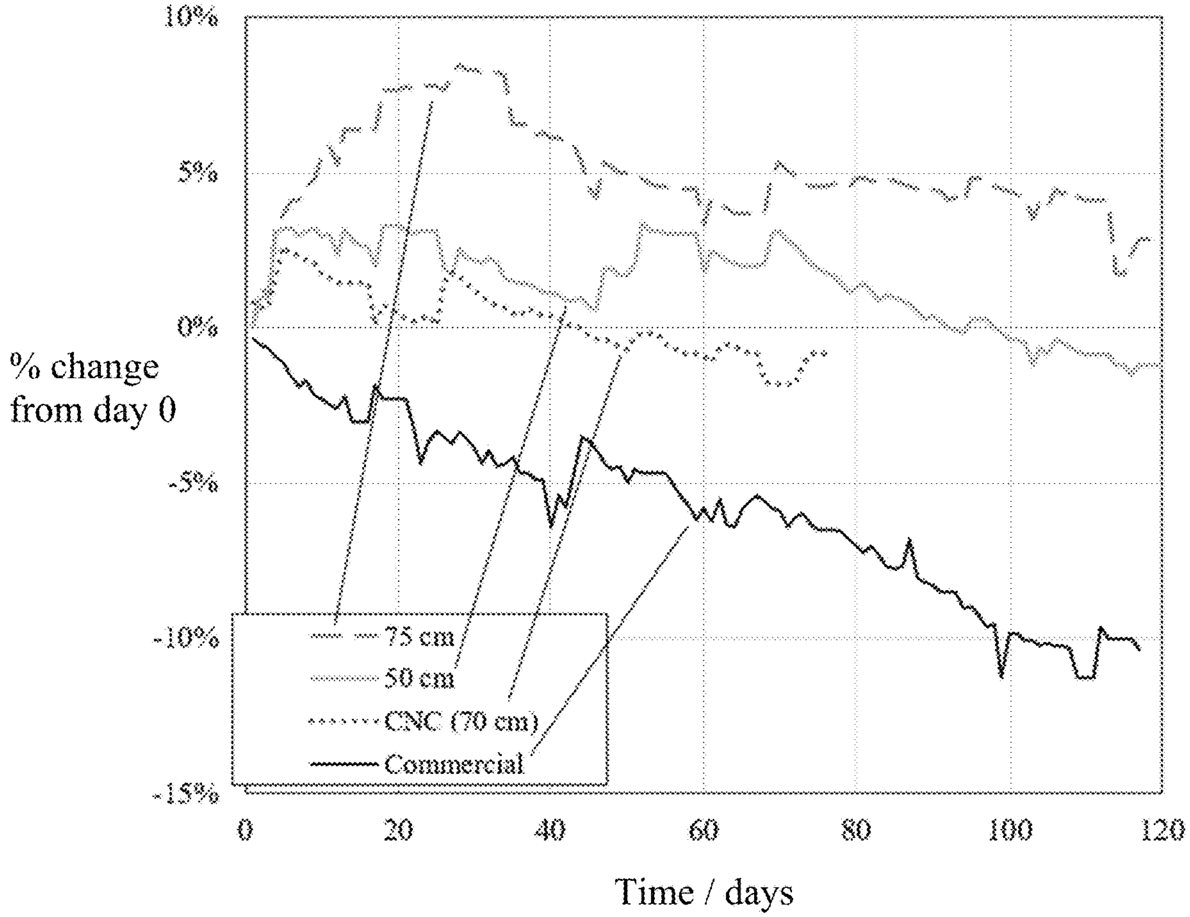
FIG. 15 shows long-term open circuit potential tests of two 3D printed reference electrode designs, one CNC milled reference electrode design, and one commercial reference electrode.
Figure 16:
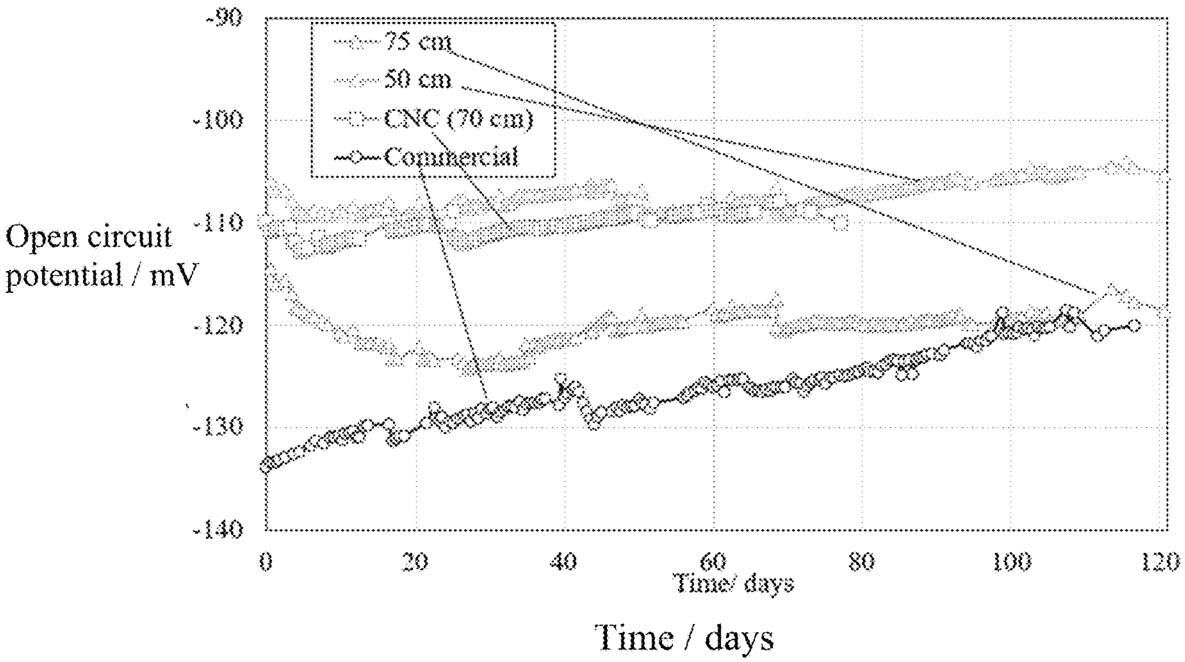
FIG. 16 shows percent change of reference electrode open circuit potentials from the first day for two-3D printed reference electrode designs, a CNC milled reference electrode design, and a commercial reference electrode.

FIG. 15 shows long-term open circuit potential tests of two 3D printed RE designs, one CNC milled RE design, and one commercial reference electrode. Open circuit potential is measured against a bare Ag/AgCl coil electrode inside the test solution (0.01 mol $kg^{-1}$ KCl). RE filling solution is 1.0 mol $kg^{-1}$ KCl+agar (3% wt) gel. FIG. 16 shows percent change of the RE open circuit potentials from the first day for the two-3D printed RE designs, the CNC milled RE design, and the commercial reference electrode.

The long term stability tests for the 3D printed and CNC milled RE designs, as well as the commercial reference electrode, are shown in FIGS. 15 and 16. Most of the RE's potentials stabilized within the first few days. Over the course of the tests, these potentials will converge to 0 mV due to the diffusion of electrolyte from the filling solution to the test solution. The change in potential for the 75 cm, 3D-printed design for the first 20 days cannot be due to dilution of the electrolyte/diffusion into the test solution since it moves away from 0 mV. FIG. 16 shows the percent change of potential from the first day (negative changes imply that the potential is moving towards 0 mV). Despite the initial behavior of the 75 cm, 3D-printed RE design, all designs demonstrated higher stability than the commercial reference electrode over the course of the experiment.

As predicted, all RE designs of this test lasted longer than those of the glass tube experiment. This further confirms that diffusion length significantly influences the lifetime of the sensor. In addition, the 3D printed RE's require less filling solution (3 mL for the 75 cm design) than the 10-16 cm glass tube REs (6 mL) as well as the commercial reference electrode (6 mL). In this way, the amount of filling solution is not directly correlated to the lifetime of the sensor, implying that small scale RE's can still demonstrate long lifetimes using this design. Improving upon this concept could lead to long-lasting, low-profile REs with minimal contamination of the analyte.

This design concept should be useful for any reference couple or filling solution phase, as well as incorporating different junction types to the RE. As such, these results should be useful for improving any potentiometric sensor designs at any scale. The length of the filling solution should be limited such that the RE's total resistance complies with the electrochemical equipment. For example, if a potentiostat needs to apply a 1 nA current between the working and reference electrodes for potential measurements, a 1 MΩ RE resistance would change the measured potential by only 1 mV. Put in perspective, a 1 mm radius channel with an aqueous filling solution with conductivity 110 mS/cm (1 M KCl(aq) at 25° C.) could be over 30 meters long without impacting the potential measurements. Since commercial potentiostats typically apply less than 1 nA for potential measurements, the total length is even less restricted. The expected lifetime of the reference couple and housing materials could be limitations as well, depending on the environment the RE is used for. The 3D printed and CNC machined designs presented here are not reusable. With slight modifications to the design, however, the long cavity could easily be flushed and refilled with new filling solution for even longer use.

As can be appreciated from the disclosure herein, the lifetime of an open-junction reference electrode was predicted using Fick's laws of diffusion. The 1D solution predicts that the length of filling solution h between the reference couple and test solution has a very high impact on the lifetime of the sensor. Increasing h from 1 mm to 1 m increased the RE's lifetime from 1 minute to 1 year using a relatively high diffusion coefficient of $D_1=2\times10^{-5}$ cm$^2$/s. The diffusion coefficient, which can be varied by using different materials, was predicted to have a lesser impact on the sensor's lifetime. The impact of filling solution length on lifetime was experimentally validated using simple RE's composed of the Ag/AgCl couple and an agar gel filling solution housed in different lengths of glass tubes, where increasing the length of the RE from 1 cm to 16 cm increased the life of the RE from 6 hours to 23 days.

3D printing and CNC machining were used to fabricate RE's with long (50-75 cm) filling solution lengths within a small volume. These designs outperformed a commercial reference electrode over the course of several months, even though they were smaller and contained less total filling solution. The design represented should be compatible with a variety of reference couples, filling solution materials, and junction types, and not limited to the Ag/AgCl couple and agar filling solution.

In summary, the mathematical and experimental results presented here develop inexpensive, low-profile, long-lasting reference electrodes for a variety of potentiometric monitoring applications.

The following references are incorporated herein by reference in their entirety.

1. Lvov, S. N., *Introduction to Electrochemical Science and Engineering,* 2nd Edition (New York: CRC Press, 2022).
2. Ives, D. J. G., and G. J. Janz, *Reference Electrodes Theory and Practice* (New York: Academic Press, 1961).
3. Hall, D. M., J. R. Beck, E. Brand, M. Ziomek-Moroz, and S. N. Lvov, *Electrochim. Acta* 221 (2016): pp. 96-106, https://linkinghub.elsevier.com/retrieve/pii/S0013468616322460.
4. Kakiuchi, T., T. Yoshimatsu, and N. Nishi, *Anal. Chem.* 79 (2007): pp. 7187-7191.
5. Lindner, E., M. Guzinski, T. A. Khan, and B. D. Pendley, *ACS Sensors* 4 (2019): pp. 549-561.
6. Granholm, K., Z. Mousavi, T. Sokalski, and A. Lewenstam, *J. Solid State Electrochem.* 18 (2014): pp. 607-612.
7. Dam, V. A., D. Wouters, and A. Farrell, Solid State Electrolyte, U.S. Pat. No. 10,634,638 B2, 2020.
8. Nolan, M. A., S. H. Tan, and S. P. Kounaves, *Anal. Chem.* 69 (1997): pp. 1244-1247.
9. Vonau, W., W. Oelßner, U. Guth, and J. Henze, *Sensors Actuators, B Chem.* 144 (2010): pp. 368-373.
10. Ha, J., S. M. Martin, Y. Jeon, J. Y. In, R. B. Brown, H. Nam, and S. C. Geun, *Anal. Chim. Acta* 549 (2005): pp. 59-66.
11. Wen, X., H. Yim, L. Hrdy, and D. Bhaijee, Low Maintenance Reference Electrode for Electrochemical Measurements (Diffusion Junction), U.S. Pat. No. 8,840,767 B2, 2014.
12. Higuchi, S., H. Okada, S. Takamatsu, and T. Itoh, *Sensors* (*Switzerland*) 20 (2020).
13. Broadley, S. T., H. P. Silverman, T.-Y. Chen, and S. R. Ragsdale, Reference Electrode Having a Flowing Liquid Junction and Filter Members, U.S. Pat. No. 9,863,049 B2, 2018.
14. Waleed Shinwari, M., D. Zhitomirsky, I. A. Deen, P. R. Selvaganapathy, M. Jamal Deen, and D. Landheer, *Sensors* 10 (2010): pp. 1679-1715.
15. Dunn, D. S., and C. S. Brossia, Semi-Permanent Reference Electrode, U.S. Pat. No. 7,459,067, 2008.
16. Liao, W. Y., and T. C. Chou, *Anal. Chem.* 78 (2006): pp. 4219-4223.
17. Vonau, W., U. Enseleit, F. Gerlach, and S. Herrmann, *Electrochim. Acta* 49 (2004): pp. 3745-3750.
18. Crank, J., *The Mathematics of Diffusional*, Second Edi (London: Clarendon Press, 1985).
19. U.S. Pat. No. 8,840,767.
20. U.S. Pat. No. 10,634,638.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible considering the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. Therefore, while certain exemplary embodiments of the devices and methods of making and using the same disclosed herein have been discussed and illustrated, it is to be distinctly understood that the invention is not limited thereto but may be otherwise variously embodied and practiced within the scope of the following claims.

What is claimed is:

1. An electrode, comprising:

an electrode housing configured to house filling solution, the electrode housing including an electrode housing first end and an electrode housing second end, the electrode housing having a length extending from the electrode housing first end to the electrode housing second end, the electrode housing having a width and a depth, each of the width and the depth being orthogonal to the length; and a single diffusion channel extending from the electrode housing first end to the electrode housing second end, the single diffusion channel having a path profile that extends along the length and at least one of the width and the depth, wherein the single diffusion channel has a diffusion channel first end that forms an opening in the electrode housing first end and a diffusion channel second end that forms an opening in the electrode housing second end; and a reference couple located within the diffusion channel first end.

2. The electrode of claim 1, further comprising:

filling solution within the single diffusion channel.

3. The electrode of claim 2, wherein:

the filling solution is agar gel concentrated with KCl electrolyte.

4. The electrode of claim 1, wherein:

the reference couple comprises silver/silver chloride, silver/silver halides, mercury/mercurous salts, or metal/metal sulfates.

5. The electrode of claim 1, wherein:

the path profile includes a path route in the length direction that is longer than a path route in the width and/or the depth direction.

6. The electrode of claim 1, wherein:

the path profile includes path routes in the length direction that are, in average, longer than path routes, in average, in the width and/or the depth direction.

7. The electrode of claim 1, wherein:

the path profile has a serpentine shape.

8. A reference electrode, comprising:

the electrode of claim 7.

9. A sensor, comprising:

the electrode of claim 1.

10. A method of fabricating an electrode housing, the method comprising:

forming a single diffusion channel extending from the electrode housing first end to the electrode housing second end, the single diffusion channel having a path profile that extends along a length of the electrode housing and at least one of a width and a depth of the electrode housing;

forming a first portion of the single diffusion channel in a first component of the electrode housing;

forming a second portion of the single diffusion channel in a second component of the electrode housing; and assembling the first component with the second component such that the first portion of the first portion of the single diffusion channel aligns with the second portion of the single diffusion channel;

wherein:

forming the single diffusion channel is performed via an additive manufacturing technique or via a machining technique.

11. The method of claim 10, wherein:

assembling the first component with the second component generates the electrode housing having the single diffusion channel extending from the electrode housing first end to the electrode housing second end, wherein the single diffusion channel forms an opening at the electrode housing first end and an opening at the electrode housing second end.

12. The method of claim 10, wherein:

the path profile includes a path route in the length direction that is longer than a path route in the width and/or the depth direction.

* * * * *